(12) United States Patent
Gillespie et al.

(10) Patent No.: US 6,807,577 B1
(45) Date of Patent: Oct. 19, 2004

(54) SYSTEM AND METHOD FOR NETWORK LOG-ON BY ASSOCIATING LEGACY PROFILES WITH USER CERTIFICATES

(75) Inventors: Don R. Gillespie, Endicott, NY (US); Thomas E. Murphy, Jr., Binghamton, NY (US); Paul F. Rieth, Apalachin, NY (US); Jeffrey S. Stevens, Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 546 days.

(21) Appl. No.: 09/662,244

(22) Filed: Sep. 14, 2000

(51) Int. Cl.$^7$ .............................................. G06F 15/16
(52) U.S. Cl. ....................... 709/227; 709/229; 709/224; 709/225; 709/203; 713/155; 713/156; 713/201
(58) Field of Search ................................ 709/203, 224, 709/225, 227, 229; 713/155, 156, 175, 201, 202

(56) References Cited

U.S. PATENT DOCUMENTS

| | | | |
|---|---|---|---|
| 5,220,603 A | 6/1993 | Parker .......................... 380/21 |
| 5,339,403 A | 8/1994 | Parker ......................... 395/425 |
| 5,497,421 A | * 3/1996 | Kaufman et al. ........... 713/156 |
| 5,761,309 A | * 6/1998 | Ohashi et al. ............... 713/156 |
| 5,784,463 A | 7/1998 | Chen et al. .................... 380/21 |
| 5,825,877 A | 10/1998 | Dan et al. ....................... 380/4 |
| 5,943,423 A | 8/1999 | Muftic ......................... 380/25 |
| 6,088,451 A | * 7/2000 | He et al. ..................... 713/201 |
| 6,233,577 B1 | * 5/2001 | Ramasubramani et al. .... 707/9 |
| 6,446,109 B2 | * 9/2002 | Gupta ......................... 709/203 |

FOREIGN PATENT DOCUMENTS

| | | | |
|---|---|---|---|
| JP | 8-335207 | 12/1996 | .......... G96F/15/00 |
| JP | 869637 | 4/1997 | ............. H04L/9/32 |
| JP | 09265551 | 10/1997 | ............ G07B/1/00 |
| JP | 10111729 | 4/1998 | ............. G06F/1/00 |
| JP | 1016979 | 6/1998 | .......... G06F/15/00 |
| JP | 10269184 | 10/1998 | .......... G06F/15/00 |
| JP | 11-25048 | 1/1999 | .......... G06F/15/00 |
| JP | 11065443 | 3/1999 | ............ G09C/1/00 |
| WO | WO 99/19845 | 4/1999 | ............. G07F/7/10 |
| WO | WO 99/35783 | 7/1999 | ............. H04L/9/30 |

OTHER PUBLICATIONS

"Generalizaing Distributed Computingenvironment Global Directory Agent for the Internet." IBM Technical Disclosure Bulletin V.40 N.8, Aug. 1997 p. 137–140.

"Safe Single–Sign–On Protocol with Minimal Password Exposure No–Decryption, and Technology–Adaptivity." IBM Technical Disclosure Bulletin V. 38 N. 3, Mar. 1995 p. 245–248.

(List continued on next page.)

*Primary Examiner*—Glenton B. Burgess
*Assistant Examiner*—Kevin Parton
(74) *Attorney, Agent, or Firm*—Shelley M. Beckstrand

(57) ABSTRACT

System for connecting a client system to a server system includes a client database of certificates; a user access panel for receiving user authentication indicia; a program interface for authenticating a certificate in the client database with respect to the indicia; a communication link interconnecting the client and server; a server database of certificates; a program interface for authenticating a certificate received from the client over with a certificate in the server database and responsive thereto for establishing a job session with the client without prompting for user input of user profile and password.

16 Claims, 6 Drawing Sheets

OTHER PUBLICATIONS

"DFS as an Internet File System." Research Disclosure #409114, May 1998, p. 625–626.

Ian Curry, Version 3 X.509 Certificates, Ver. 1.0. Entrust Tehnologies White Paper, Jul. 1996. Copied Apr. 5, 2000 from <http://www.entrust.com/resources/pdf/x509v3.pdf>.

Halevi, S. et al. "Public–Key Cryptography and Password Protocols." IBM Thomas J. Watson Res. Center, Yorktown Heights, NY. 5th ACM Conference on Computer and Communications Security. New York, NY pp. 122–131. Inspec INSM #6269871. 1998.

Hayton, R.J. et al. "Access Control in an Open Distributed Environment." Proceedings. 1998 IEEE Symposium on Security and Privacy. p. 3–14, 1998. Inspec INSM #5939864.

Carden, P. "The New Face of Single Sign–On." Network Week, V. 4, N. 31, p. 31–33, Apr. 28, 1999. Inspec INSM #6261054.

Goldman, J. "Internet Security, The Next Generation. When Software Encryption is not Enough." Web Techniques, V. 2, N. 11, p. 43–46, Nov. 1997. Inspec INSM #5741715.

Sameshima, Y. "Security Architecture Based on Secret Key and Privilege Attribute Certificates." Proceedings of the IFIP/IEEE International Conference on Distributed Platforms: Client/Server and Beyond . . . pp. 357–369. Inspec INSM #5374945.

Kikuchi, H. "Performance Evaluation of an Implementation of Certificate Distribution System in Internet Privacy Enhanced Mail." Transactions of The Information Processing Society of Japan, V. 36, No. 8, p. 2063–2070, Aug. 1995. Inspec INSM #5105062.

* cited by examiner

SYSTEM AND METHOD FOR NETWORK LOG-ON BY ASSOCIATING LEGACY PROFILES WITH USER CERTIFICATES

BACKGROUND OF THE INVENTION

1. Technical Field of the Invention

This invention pertains to computer networks. More particularly, it pertains to establishing a client to server connection by associating legacy profiles with user certificates to simplify the log-on or sign-on process.

2. Background Art

Referring to FIG. 1, many legacy and current computer systems, such as server system 104 accessed over network (such as an Internet or intranet network) 102, use the concept of user profiles and passwords to establish the identity of a user on that system. In other words, as is represented by lines 107 and 109, a user must submit a profile name 106 and accompanying password 108 to establish that he is an allowed user on this computer 104. This is typically enforced via what is called a Sign-On Panel 100 where, as is represented by line 111, one is prompted by server 104 to enter his profile name 106 and password 108. The user must remember and enter the exact combination of profile (a.k.a., user identifier) 106 and passwords 108, or is denied access to the server 104.

This introduces problems. The user is expected to "memorize" his name 106 and password 108. If the user is a software developer, who is required to work on many different computer systems 104, recalling multiple names and passwords becomes intimidating. This is especially true when passwords 108 can have arcane rules, such as being required to have so many numbers or alphabetic characters, and must be changed periodically. Because the user must remember so many, or because he simply cannot remember any, these user profiles and/or associated passwords are written down on paper, posted on the computer terminal or nearby note board, or put in a desk or other insecure place. Whatever the case, the user has compromised security on the computer system, should someone manage to get this information, not to mention the additional frustration and time it causes the user.

This problem is compounded in networks, where the user may use a client application to connected to a server 104. To sign on to that server, the user must send his profile name 106 and password 108 over the network 102 to server 104. This means that at any point in the network 102, someone can intercept this information before it arrives at the server 104, find out the user's profile name 106 and password 108, and then use it without his knowledge. Thus, a primary security concern is protecting information being exchanged between clients 100 and servers 104, in particular any server 104 that prompts 111 for a profile and password.

Referring to FIG. 2, protection of data while it traverses the Internet is essential for many companies and their customers. One popular means of securing data is via Secure Sockets Layer (SSL) technology, which uses RSA Data Security techniques to encrypt and decrypt data at each endpoint, foiling attempts to read any data intercepted in transit through network 102. SSL also makes possible exchange of certificates 110, 112, which are a mechanism by which each endpoint 101, 104 (such as a computer node, server 104 or client 101) can validate the identity of the other endpoint. For example, if a user 101 wants to connect and sign-on to a particular web server 104, certificates allow the user to be sure the connection is really to that web server 104, and not some other machine. Likewise, certificates allow the web server 104 to be sure of the identity of a particular user 101. As is represented by lines 113 and 115, after the certificate 110, 112 is used to authenticate the user 101 and server 104, the certificate is no longer needed, and the user 101 is allowed to establish an SSL connection to the web server 104 and proceed to a sign-on panel 100, where he must then enter and communicated via lines 117, 119 and 103, 105, respectively, his traditional user profile 106 and password 108 to server 104 for comparison with profile 114 and password 116.

Since certificates 110, 112 have already validated the client identity, it is redundant to require that the user, or client 101, also sign-on using a profile name 106, 114 and password 108, 116. This profile information is not part of any SSL information exchange, which means that even though the user has already established his identity via SSL 110, 112, he must still prove his identity again, once via SSL and again via sign-on 100 with profile 106 and password 108. This makes it even more difficult for a particular user to manage his profiles and passwords.

User exits enable server administrators a way to provide a program to validate a client identity using the IP address of the connection. This security is very weak, and can be faked, since IP addresses are easily spoofed and cannot be trusted. Alternatively, encrypted passwords may be sent to a Telnet Server, which provides good security.

It is an object of the invention to provide a system and method for bypassing sign-on panels, avoiding double validation for SSL users.

It is an object of the invention to provide a network connection which requires no exchange of profiles and passwords over the network.

It is an object of the invention to eliminate or substantially reduce profile and password management.

It is an object of the invention to provide a system and method for allowing a user, once having created, received or installed a certificate, to log-on to a computer network without further exchange of profiles and passwords.

It is an object of the invention to provide an improved system and method for enabling exchange or initiation of specific actions. Such actions may include initial programs, object access authority, and environment set up.

It is an object of the invention to provide a system and method for boosting performance by turning encryption off after client authentication.

It is an object of the invention to provide a system and method enabling a user to be limited to a pre-defined profile or to the number of sessions simultaneously active.

It is an object of the invention to avoid the use of passwords to sign-on to a server.

SUMMARY OF THE INVENTION

In accordance with preferred embodiments of the invention, a system and method are provided for connecting a client system to a server system. A user profile is associated with a user certificate in a client database. Responsive to user input of said profile, the user is authenticated to a certificate in the client database, which certificate is then communicated to the server. The server validates the certificate and upon validation establishes a job session with the client without prompting the user for subsequent input of profile and password.

In accordance with an aspect of the invention, there is provided a computer program product configured to be operable to connect a client to a server system based upon certificates without server prompting for user input of profile and password.

Other features and advantages of this invention will become apparent from the following detailed description of the presently preferred embodiment of the invention, taken in conjunction with the accompanying drawings.

BEST MODE FOR CARRYING OUT THE INVENTION

In accordance with a preferred embodiment of the present invention, the certificate function is extended to associate user profile name and optional information about the client in the server. Once the certificate has validated the user's identity, the server may extract the profile name and optional information from the certificate, or associate the profile name and optional information based on the certificate. If the client certificate is authenticated, then the server automatically (that is, without use of a sign-on panel) performs sign-on of that user using the extracted or associated profile.

Figure 3:
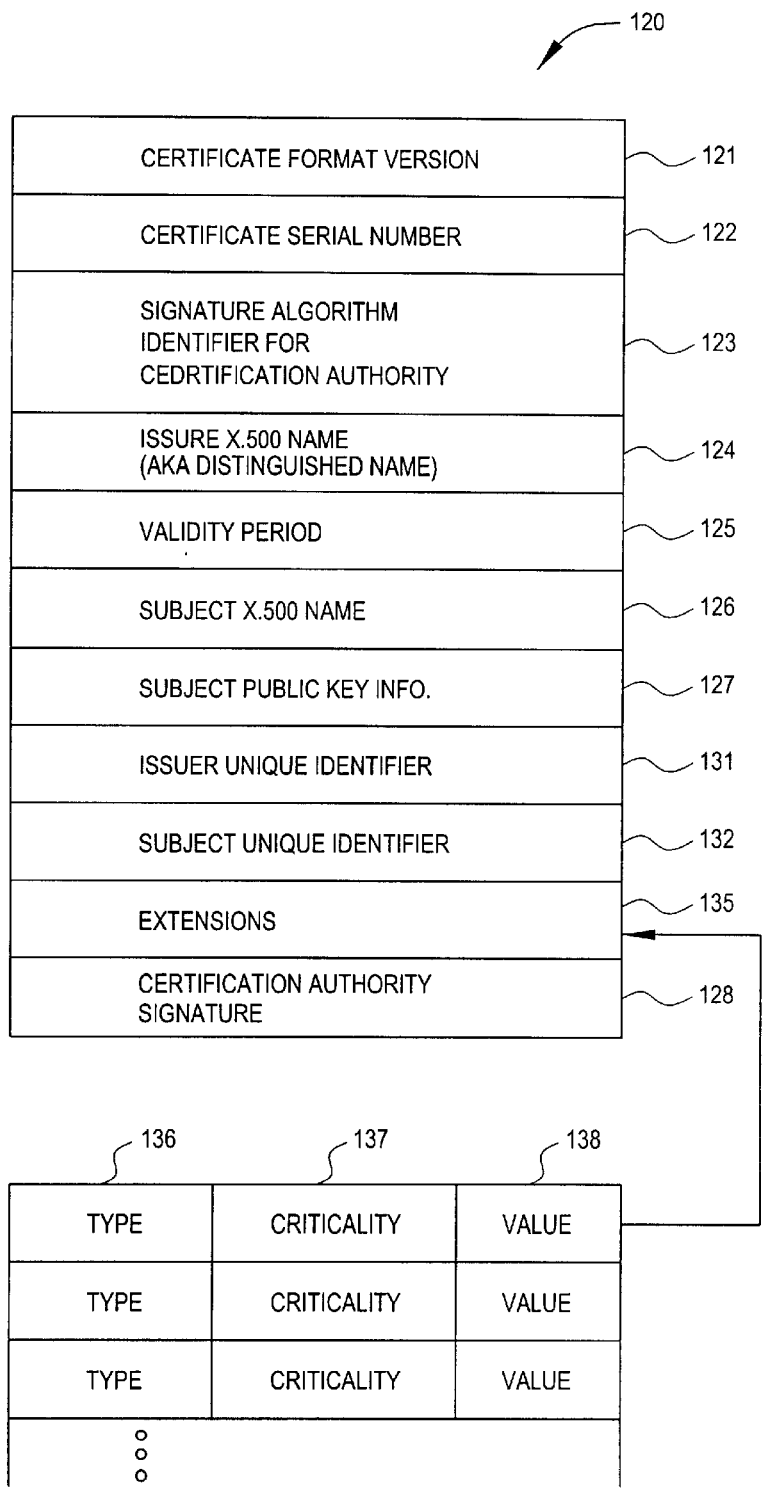
FIG. 3 illustrates the format of an exemplary certificate used in the system and method of the present invention.

Referring to FIG. 3, an example of a certificate 120 useful in connection with the present invention is the X.509 certificate described in Ian Curry, Version 3 X.509 Certificates, July 1996, copyright Entrust Technologies, 1997. Certificate 120 includes, in a first version fields 121–128. A second version adds fields 131 and 132, and a third version adds fields 136–138. Through the use of such certificates, the concept of trust in network security is provided.

Version field 121 indicates the version of the certificate format. (Example entry: version 3.)

Serial number field 122 specifies the unique, numerical identifier of this certificate 120 in the domain of all public key certificates issued by the certification authority (CA). (Example entry: 12345678.)

Signature algorithm field 123 identifies the algorithm used by the CA to sign the certificate 120, and specifies both a public-key algorithm and a hashing algorithm used by the CA to sign certificates in certification authority signature field 128. (Example entry: RSA with MD5.)

Issuer name field 124 specifies, for example, the X.500 distinguished name (DN) of the CA that issued the certificate. (Example entry: c=US, o=ACME may be used by the CA issue certificates to employees of the ACME Corporation in the United States.)

Validity period field 125 specifies the dates and times for the start date and expiry date of certificate 120.

Subject name field 126 specifies the distinguished name (DN) of the entity holding the private key corresponding to the public key identified in the certificate (field 127). (Example entry: c=US, o=ACME, cn=John Q. Public may be the DN for employee John Q. Public of the ACME Corporation.)

Subject public key information field 127 identifies (a) the value of the public key owned by the subject and (b) the algorithm identifier specifying the algorithm with which the public key is to be used. (Example entry: DSA with SHA-1, or RSA with MD5.)

Issuer unique identifier field 131 is an optional field for specifying a bit string to uniquely identify the issuer name 124 in the event that the same issuer name 124 has been assigned to more than one CA over time.

Subject unique identifier field 132 is an optional field for providing a bit string to uniquely identify the subject name 126 in the event that the same subject name 126 has been assigned to more than one subject over time.

Fields 136–138 provide generic extension fields for defining extensions to the certificate. Each extension 135 includes fields of three types: type 136, criticality 137, and value 138. Extension type field 136 defines the type of the data in the corresponding extension value field 138. Extension criticality field 137 is a single-bit flag defining the extension as critical or not. When set to critical, this flag 137 identifies the associated extension value field 138 as containing information of such importance that an application cannot ignore the information, and must reject the certificate if it cannot process the extension. Extension value field 138 contains the actual data for the extension. Examples of standard extensions 135 include key information, policy information, policy mapping information, user and CA attributes, and certification path constraints. Policy mapping fields 135 apply to cross-certificates, which are created when one CA certifies the verification public key of a different CA. (Refer to Ian Curry, supra, for additional information regarding extensions 135.)

In accordance with a preferred embodiment of the invention, a user is enabled to execute his own application on a legacy system with a user profile and password, and connect to a server without having to send the user profile and optionally password to the server. This is done through the use of certificates. Certificates take advantage of encryption and keys to identify a user; they include public encryption keys and are themselves encrypted, at least in part, when communicated, and private keys are held by both the client and server systems.

Figure 4:
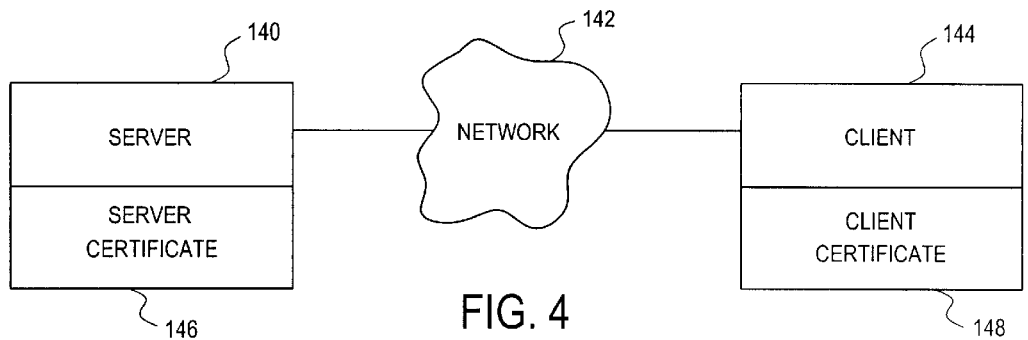
FIG. 4 is a high level system diagram illustrating server and client certificates.
Figure 5:
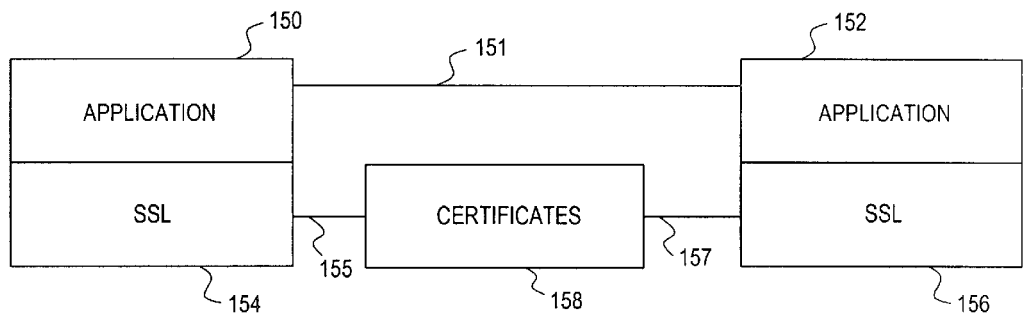
FIG. 5 is a high level system diagram illustrating the use of certificates in establishing a secure sockets layer prior to establishing an application layer.
Figure 6:
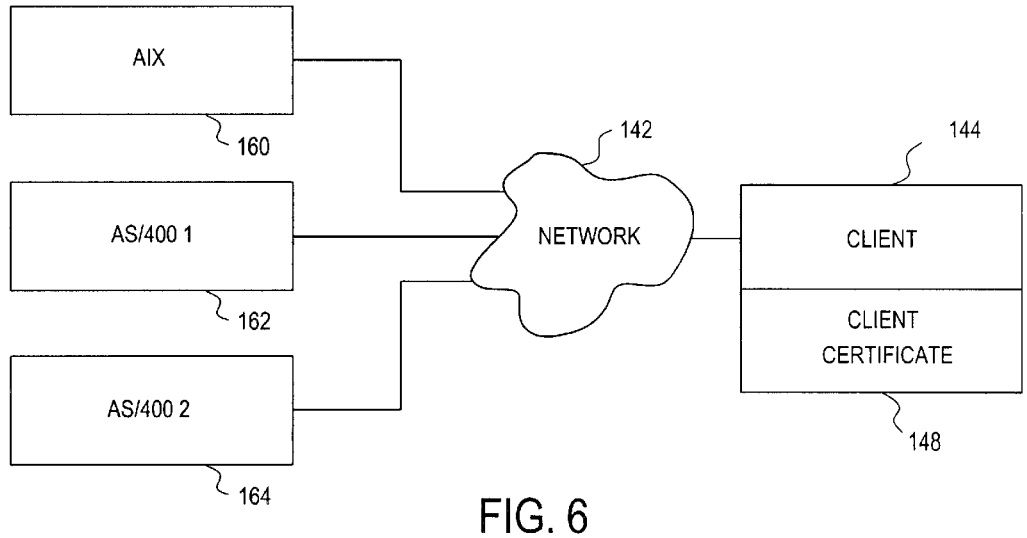
FIG. 6 is a high level system diagram illustrating the use of client certificates in accessing various server systems over a network.
Figure 7:
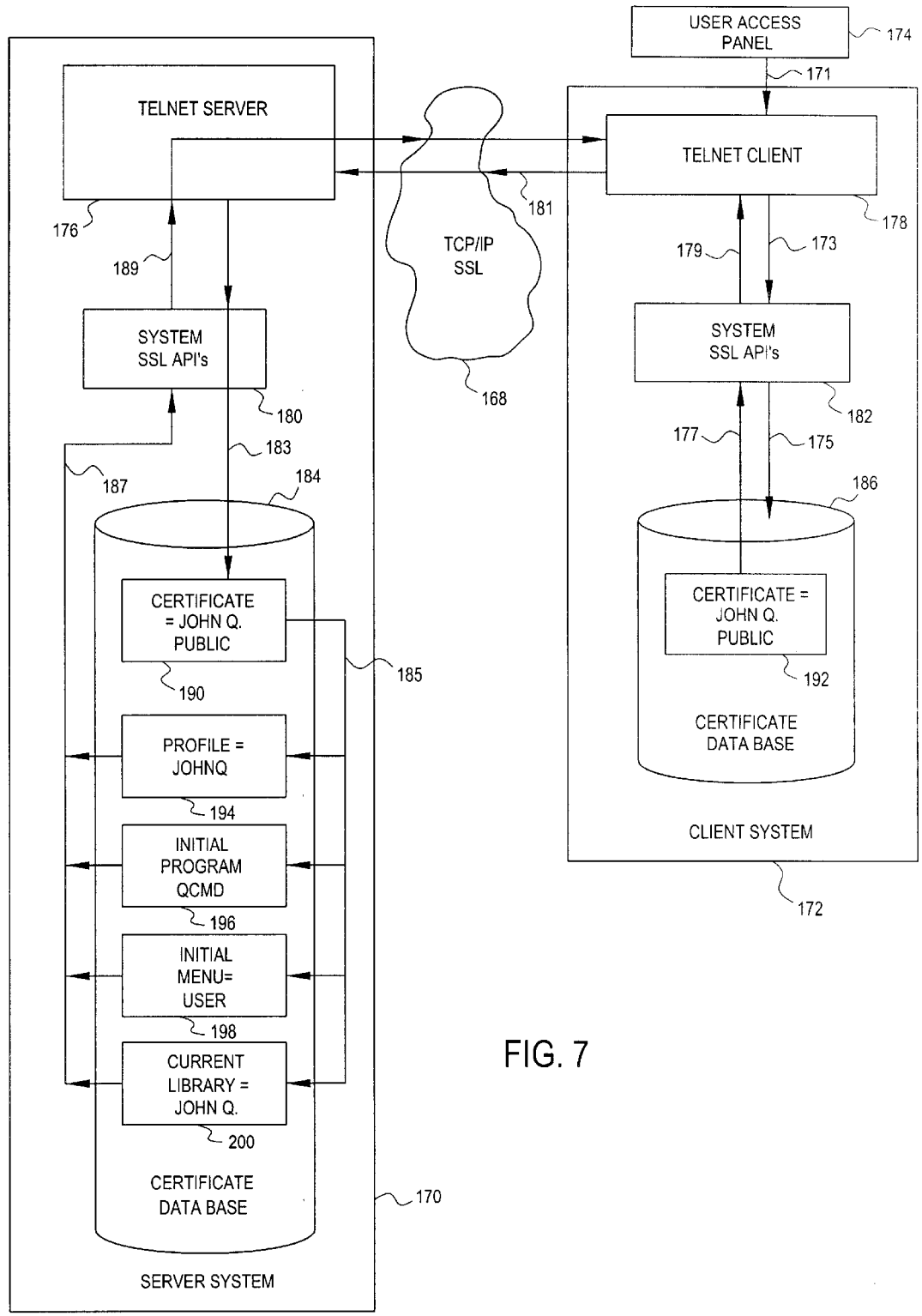
FIG. 7 illustrates the system of a preferred embodiment of the invention for associating legacy profiles with user certificates to simplify the log-on or sign-on process.

Referring to FIG. 7, a client or user 172 is provided a certificate 192 by a certification authority (CA), which is then installed in database 186 on the client system. User access panel 174 is provided for a user to first authenticate himself to his own certificate at the client system, such as a personal computer, using a password or, alternatively, iris scan, fingerprint, or the like. Once authenticated at the client, the user's certificate 192 is sent to the server 170 over network 168 as part of a log-on process or some other connection creation process. Depending upon the connection protocol being used, some or all information communicated may be encrypted. Example protocols for making sure certificates flow through a network without compromise include Netscape's secure sockets layer (SSL), and transport layer security (TLS) protocols. In accordance with a preferred embodiment of the present invention, information sufficient for the server 176 (such as an IBM AS/400, VM or AIX system) to determine the user password without asking the user to submit it is included in the certificate. Referring to FIG. 4, in legacy systems, the certificate 148 is transmitted from client 144 to server 140 over network connection 142, but without the user password. Referring to FIG. 5, certificates 158 have thus been used to establish connection between, for example, SSL layers 154, 156, and this connection was followed by establishing a session 151 at the application layer 150, 152 during which the user is presented with an application layer screen (such as a VM ready message, AS/400 or Unix command line) for submitting user identification and passwords.

Referring further to FIG. 7, in accordance with a further embodiment of the invention, an application may be launched responsive to certificate 192 data specifying user ID 194, password, first program to launch 196, menu 198 or current library 200, or the like.

In accordance with a further embodiment of the invention, the server certificate 190 may be customized by the certification authority without requiring any input from the user. Thus, in a manner transparent to the user, the certification authority may define the user profile 194 including, for example, applications and data to which the user is allowed access.

In accordance with a preferred embodiment of the invention, a user profile is included in a certificate without being input by the user and which may be even unknown to the user. That is, the client need not know, and may not be given, the user identifier 126 and password 127 required in the certificate 192(see FIG. 3). This allows the certification authority to restrict user access to a specific terminal or personal computer 172. That is, the user, not knowing his own identifier or password, may not access the server 170 from a client system 172 which does not have the certificate 192 installed. In accordance with an aspect of the invention, the user password 127 is not in the certificate 192 provided to the user but is retained at the server 170 and accessed at the server by the profile 126, 194 which is in the user certificate 192. Optionally, the password 127 is included in the user certificate 192. Further, along with the user identifier 126 buried in the certificate, further environment criteria 135 associated with work to be performed on behalf of a user identifier or sign on instance may be buried or included in the certificate. In either case, upon receiving the user certificate 192, the server 176 knows that client authentication has occurred and the user is automatically signed on to the server and, optionally, the server responds with a menu, library, or application 189 back to the server without prompting the user for entry of client identifier and password.

In accordance with a further embodiment of the invention, additional information 196–200 is associated along with the profile 194, such as any initial programs to be run, environment set-up, current libraries, etc. Further, the administrator of a terminal server 176 may explicitly cause automatic sign-on to occur based solely on certificate 192 authentication, using a pre-defined profile 194, without exposing a sign-on panel. By eliminating a sign-on panel, a system administrator can remove the opportunity to sign-on using a high level or powerful profile, which grants access to many protected and secure objects.

Since certificates contain information about the user, almost any kind of descriptive information about the user can be put into the certificate. One possibility is to use the Subject X.500 Name field 126 (also called the Distinguished Name field) of an X.509 certificate 120. For example, a certificate may be created with the string "John Q. Public" to describe the user of that certificate. Additional information may include an Internet address, such as @"John O. Public <johnq@us.ibm.com>". The terminal server could read this certificate and parse the profile JOHNQ (and any optional information), using it to bypass Sign-on Panels.

Referring again to FIG. 3, rather than using the Subject X.500 Name field 126, X.509 extensions 135 may be used. Extensions 135 can be added or appended to an existing certificate in a standard or generic fashion to include additional information. This additional information can be a simple text string, number values, dates, graphics or a complex data structure. The extension Type field 136 indicates which of these standardized data types is being used. The extension criticality field 137 indicates whether the extension information is of such importance the information cannot be ignored. The extension Value field d138 contains the actual data, say "JohnQ.Public<johnq@us.ibm.com>".

Using extensions 135 could make certificate 120 updates easier to support as compared with using the Distinguished Name field 126, depending on the implementation.

Using certificates 192 to pass user information 196–200 can be cumbersome to maintain and support, so a preferred alternative is for the server to associate certificate information 196–200 to the certificate 190 at the terminal server. For example, a certificate 192, 190 with the Distinguished Name 124 of "John Q. Public" can be associated with an existing profile 194 on the system 170 of JOHNQ. The terminal server 176 uses system support tools to make the association between "John Q. Public" certificates 190, 192 and the user profile 194 "JOHNQ", and can then bypass the sign-on panel using profile JOHNQ. The client never even needs to know about profile JOHNQ 194, nor does the certificate need to store JOHNQ in the Subject X.500 Name 126 or extensions 135.

Figure 8:
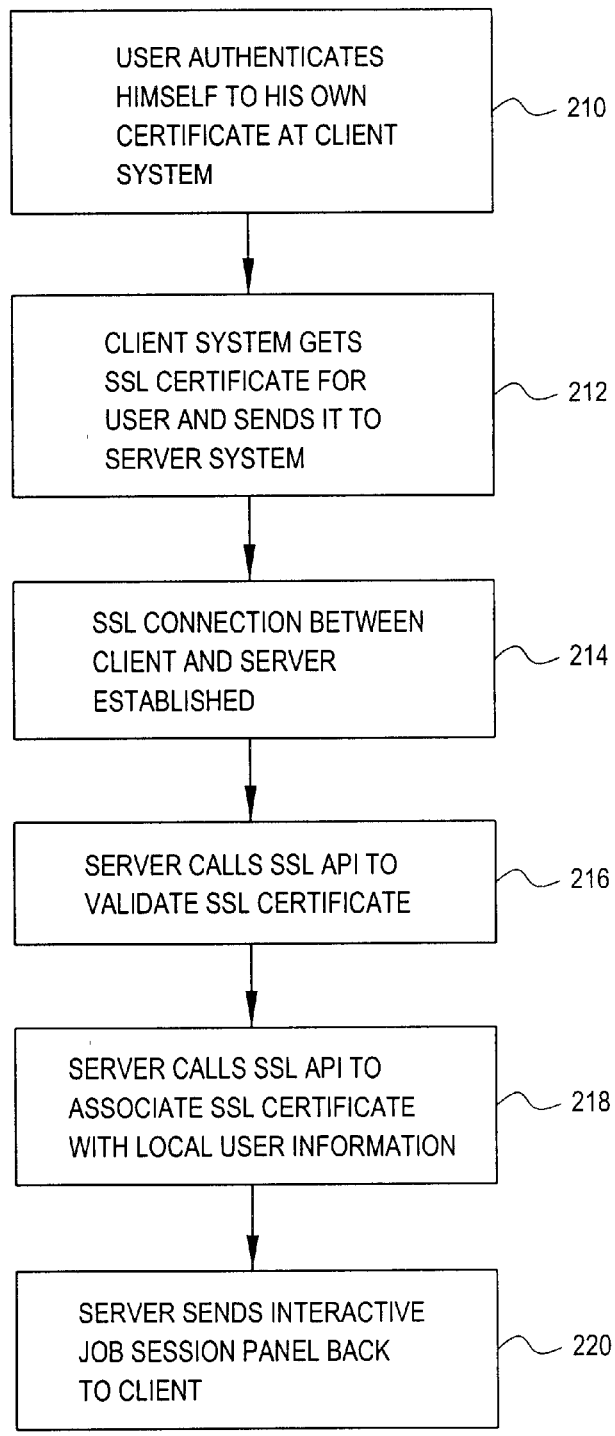
FIG. 8 illustrates the method of a preferred embodiment of the invention for associating legacy profiles with user certificates to simplify the log-on or sign-on process.

Referring to FIG. 8, the process of a preferred embodiment of the invention includes the following steps.

In step 210, as is represented by line 171, the user or subject, using, for example, user access panel 174 authenticates himself to his own certificate 192 at client system 172.

In step 212, as is represented by lines 173, 175, 177 and 179, terminal (such as, Telnet) client 178 gets SSL certificate 192 from database 186 for John Q. Public and, as is represented by line 181, sends the certificate to server 170. In this specific example, and not by way of limitation, a Telnet server 176/Telnet client 178 is shown.

In step 214, as is represented by line 181, an SSL connection is established between client 172 and server 170.

In step 216, as is represented by line 183, server 176 calls SSL API 180 to validate SSL certificate 192.

In step 218, as is represented by lines 183 and 185, server 176 calls SSL API 180 to associate SSL certificate 192 optionally with local user information 194–200.

Figure 1:
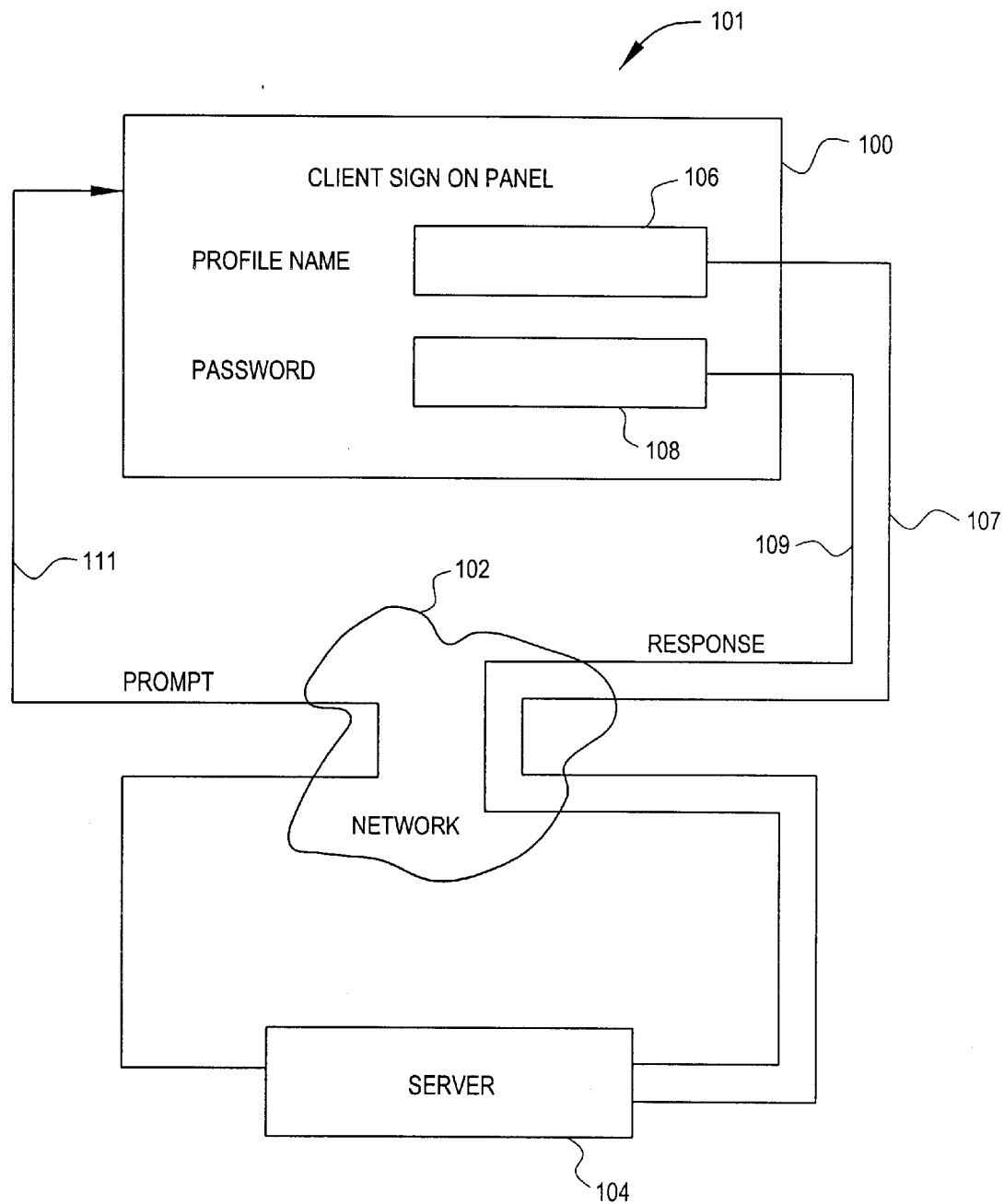
FIG. 1 is a high level system diagram illustrating a prior art client sign-on panel for communicating user profile name and password to a server.
Figure 2:
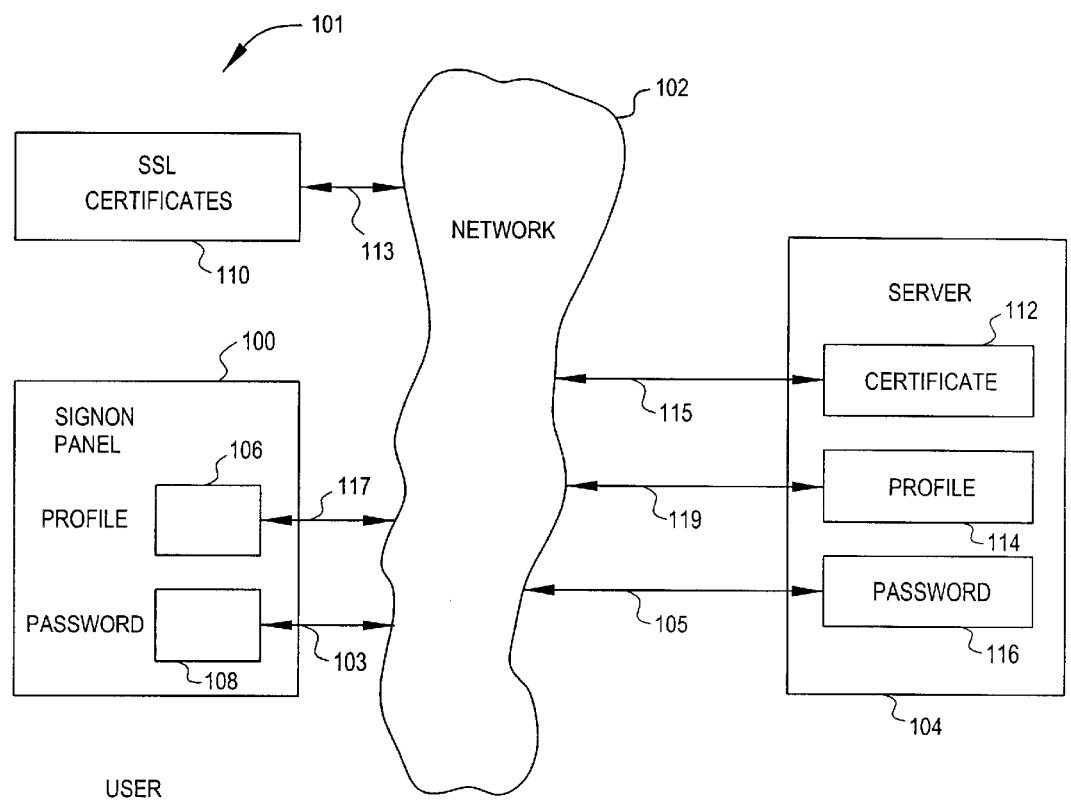
FIG. 2 is a high level system diagram illustrating the use of certificates in accordance with the prior art.

In step 220, any sign-an panel 100 (FIG. 1, for example) is bypassed, using various pre-assigned values for that user. Instead of sending client back a sign-on panel 100 over SSL connection 189, an interactive job session panel is sent to client 172.

ADVANTAGES OVER THE PRIOR ART

It is an advantage of the invention that there is provided a system and method for bypassing sign-on panels, avoiding double validation for SSL users.

It is an advantage of the invention that there is provided a system and method for a network connection which requires no exchange of profiles and passwords over the network.

It is an advantage of the invention that there is provided a system and method to eliminate or substantially reduce profile and password management.

It is an advantage of the invention that there is provided a system and method for allowing a user, once having created, received or installed a certificate, to log-on to a computer network without further exchange of profiles and passwords.

It is an advantage of the invention that there is provided an improved system and method for enabling exchange or initiation of specific actions. Such actions may include initial programs, object access authority, and environment set up.

It is an advantage of the invention that there is provided a system and method for boosting performance by turning encryption off after client authentication.

It is an advantage of the invention that there is provided a system and method enabling a user to be limited to a pre-defined profile or to the number of sessions simultaneously active.

It is an advantage of the invention that there is provided a system and method for avoiding the use of passwords to sign-on to a server.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

While a Telnet server 176/Telnet client 178 is illustrated in the example of FIG. 7, alternative embodiments include an server supporting a profile/password legacy logon. Such alternatives include file transfer protocol (FTP) server/client and post office protocol (POP) server/client, inasmuch as these also use profile and (optionally) passwords.

Accordingly, the scope of protection of this invention is limited only by the following claims and their equivalents.

We claim:

1. A method for connecting a client system to a server system, comprising the steps of:

associating at said client a legacy profile with a user certificate, said legacy profile including a user name required by a network service to be mapped to it together with an associated user key to implement security;

responsive to user input of said legacy profile, authenticating said user to said certificate;

communicating said certificate to said server;

validating said certificate at said server; and responsive to said validating step and without prompting said user for said profile and said associated user key, establishing an interactive job session with said network service.

2. The method of claim 1, further comprising the steps of:

associating said certificate with local user information.

3. The method of claim 2, said local user information including an initial program, and further comprising the step of executing said initial program.

4. The method of claim 2, said local user information including an initial menu, and further comprising the step of presenting said initial menu to said user.

5. The method of claim 2, said local user information including a current library, and further comprising the step of enabling user access to said current library.

6. The method of claim 1, further comprising the step of sending an interactive job session panel to said client.

7. The method of claim 2, said user information being associated with said certificate at said client, and further including the step of communicating said user information to said server in said certificate.

8. The method of claim 2, said user information being associated with said certificate at said server, and further including the step responsive to a user profile received from said client in said certificate of accessing said user information at said server.

9. A method for providing a network connection which requires no exchange of profiles and passwords over said network, comprising the steps of:

responsive to user authentication at a client, accessing at said client and communicating from said client to a server a certification authority provided certificate associated with a legacy user identifier, said legacy user identifier including a user name used by a service and required by said service to be mapped to it together with a password to implement security; and responsive to server authentication of said certificate and responsive to said legacy user identifier without prompting a user at said client for a user profile and said password, establishing a job session.

10. Method executed at a client for logging on to a computer network, comprising the steps of:

receiving a certificate from a certification authority;

authenticating a user with respect to said certificate;

once authenticated, communicating said certificate associated with a legacy user identifier to said network, said legacy identifier including a user name required by a network service to be mapped to it together with an associated password to implement security; and receiving from said network a job session without further exchange of profiles and any associated passwords.

11. The method of claim 10, further comprising the step of encrypting at least a portion of said certificate for communication to said network and, upon receiving said job session, turning off encryption for subsequent communication to said network.

12. System for connecting a client system to a server system, comprising:

a client database of certificates;

a user access panel for receiving user authentication indicia;

a program interface for authenticating a certificate in said client database with respect to said indicia;

a communication link interconnecting said client to said server;

a server database of certificates;

a program interface for authenticating a certificate associated with a legacy user identifier received from said client over said communication link with a certificate in said server database, said legacy user identifier including a user profile used by a service together with an associated password to implement security, said service requiring that said user profile be mapped to it, and responsive thereto for establishing a job session to said client without prompting for user input of said user profile and said associated password.

13. The system of claim 12, further comprising:

a user information database accessed by a certificate database profile for selectively executing or enabling an initial program, initial menu, or library.

14. A program storage device readable by a machine, tangibly embodying a program of instructions executable by a machine to perform method steps for connecting a client system to a server system, said method steps comprising:

associating at said client a legacy profile with a user certificate, said legacy profile including a user name used by a service together with an associated key to implement security, said service being a service which requires that said legacy profile be mapped to it;

responsive to user input of said legacy profile, authenticating said user to said certificate at said client;

communicating said certificate to said server;

validating said certificate at said server; and responsive to said validating step and without prompting said user for said profile and said associated key, establishing an interactive job session.

15. An article of manufacture comprising:

a computer useable medium having computer readable program code means embodied therein for providing a network connection which requires no exchange of profiles and passwords over said network, the computer readable program means in said article of manufacture comprising:

computer readable program code means for causing a computer to effect responsive to user authentication at a client, accessing at said client and communicating from said client to a server a certification authority provided certificate associated with a legacy user identifier, said legacy user identifier including a user name required to be mapped to it by a service together with an associated user password to implement security; and computer readable program code means for causing a computer to effect responsive to server authentication of said certificate and without said service prompting a user at said client for said legacy user profile and password, establishing a job session.

16. A computer program product or computer program element for establishing a client to server connection according to the steps of:

associating at said client a legacy profile with a user certificate, said legacy profile including a user name used by a service together with an associated key to implement security, said service being a service that requires that said user name be mapped to it;

responsive to user input of said legacy profile, authenticating said user to said certificate;

communicating said certificate to said server;

validating said certificate at said server;

responsive to said validating step and without prompting said user for said legacy profile, establishing an interactive job session; and associating said certificate with local user information.

* * * * *